Nov. 23, 1954  G. W. JOHNSON  2,694,829
POULTRY PLUCKING MACHINE
Original Filed July 11, 1949  2 Sheets-Sheet 1

INVENTOR.
Gordon W. Johnson
BY
ATTORNEY.

Nov. 23, 1954 G. W. JOHNSON 2,694,829
POULTRY PLUCKING MACHINE
Original Filed July 11, 1949 2 Sheets-Sheet 2
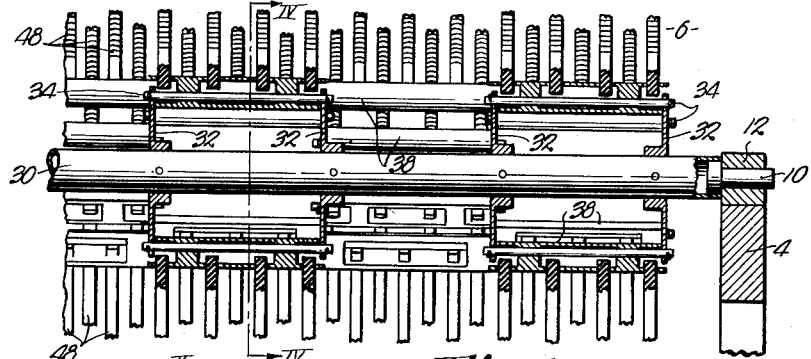
Fig. 3.
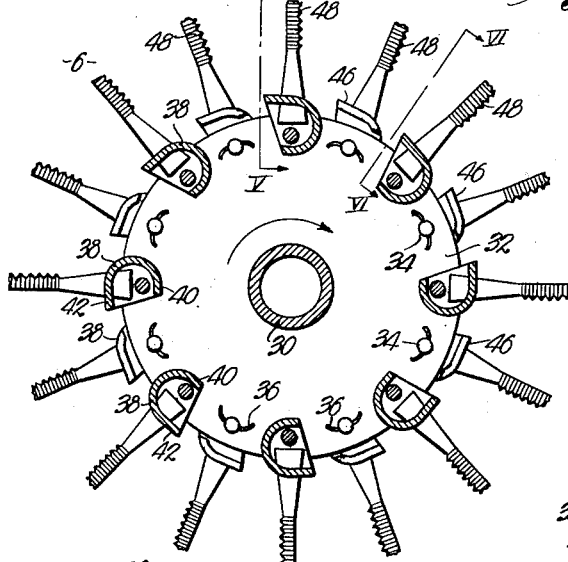
Fig. 4.
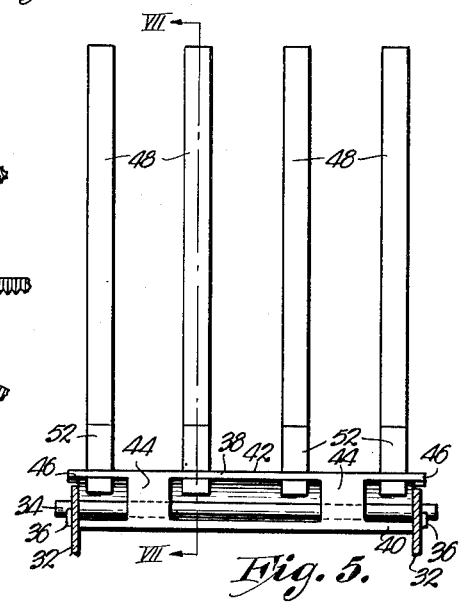
Fig. 5.
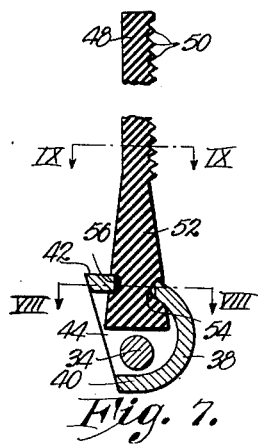
Fig. 7.
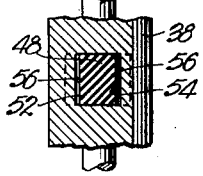
Fig. 9.
Fig. 8.
Fig. 6.
INVENTOR.
Gordon W. Johnson
BY
ATTORNEY.

United States Patent Office 2,694,829
Patented Nov. 23, 1954

2,694,829

POULTRY PLUCKING MACHINE

Gordon W. Johnson, Raytown, Mo., assignor to Gordon Johnson Equipment Company, Kansas City, Mo., a corporation of Missouri Original application July 11, 1949, Serial No. 104,037, now Patent No. 2,637,067, dated May 5, 1953. Divided and this application October 2, 1952, Serial No. 312,791

2 Claims. (Cl. 17—11.1)

This invention relates to new and useful improvements in poultry plucking machines, and has particular reference to poultry plucking machines of the rotary drum type.

This application is a division of my co-pending application Serial No. 104,037 filed July 11, 1949, now Patent No. 2,637,067, dated May 5, 1953.

In poultry plucking machines wherein feathers are removed from the fowl by means of flexible, resilient fingers mounted on the peripheries of rotatably driven drums, it has been found advantageous to mount the fingers on the drum pivotally, about axes parallel to the axis of the drum. This permits the weight and resilience of the fingers to be selected for maximum efficiency of picking, while the pivotal mounting permits the fingers to be deflected to pass around the body of the fowl. A disadvantage of this arrangement has been that whenever a finger became worn at either its pivot or at its fowl contacting portions, the entire finger had necessarily to be replaced. The principal object of the present invention is, therefore, the provision of a poultry picking machine of the class described wherein the resilient fingers are each fixed in rigid members which are in turn pivotally mounted on the drums. By this arrangement use may be made of metallic pivot members having good wearing characteristics, and the resilient fingers may be individually removed and replaced when necessary. Valuable economies are thus effected, since the pivot members are virtually indestructible and the fingers themselves are more economical to manufacture.

Another object is the provision of a poultry plucking machine of the class described wherein the pivot members may be removed individually.

A further object is the provision of means whereby the resilient fingers are secured against accidental removal from the pivot members.

Other objects are simplicity and economy of construction, dependability and efficiency of operation, and ease and convenience of servicing.

With these objects in view, as well as other objects which will appear in the course of the specification, reference will be had to the drawing, wherein:

Fig. 3 is an enlarged fragmentary section taken on line III—III of Fig. 1.

Fig. 4 is an enlarged section taken on line IV—IV of Fig. 3, with the outer end portions of the fingers broken away.

Fig. 5 is an enlarged fragmentary section taken on line V—V of Fig. 4.

Fig. 6 is an enlarged fragmentary section taken on line VI—VI of Fig. 4.

Fig. 7 is an enlarged and foreshortened section taken on line VII—VII of Fig. 5.

Fig. 8 is a fragmentary section taken on line VIII—VIII of Fig. 7.

Fig. 9 is a section taken on line IX—IX of Fig. 7.

Figure 1:
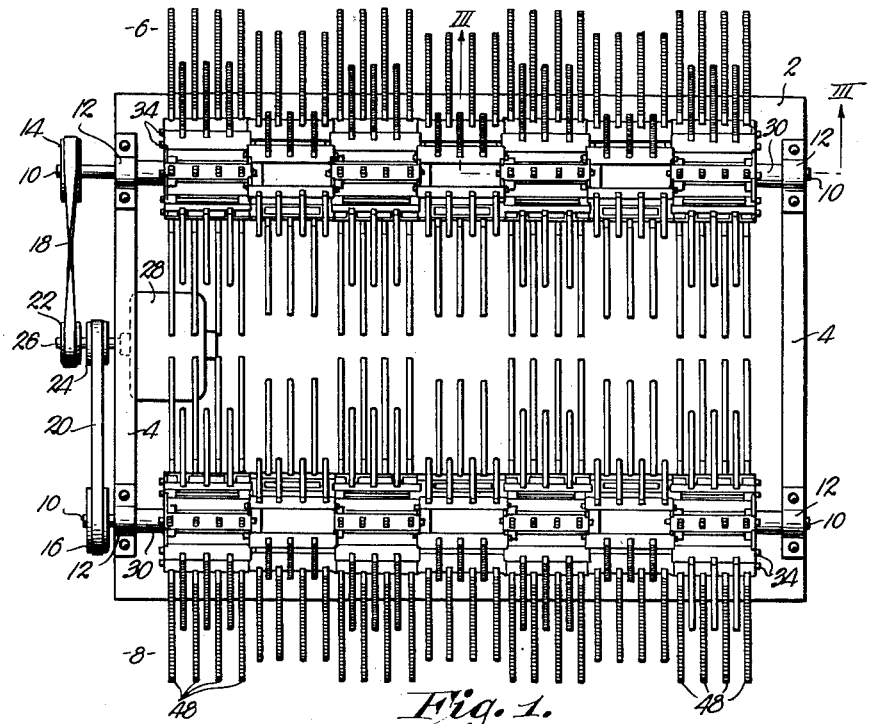
Fig. 1 is a plan view of a poultry plucking machine embodying the present invention.

In each of the views the flexible resilient fingers are shown extended radially to the drums, in the position into which they are urged by centrifugal force when the drums are rotated. Like numerals apply to similar parts throughout the several views, and the numeral 2 applies to a base on which are rigidly mounted two parallel upright end frames 4. A pair of horizontal drums 6 and 8 are carried by said end frames in horizontally spaced apart parallel relation, each of said drums having end shafts 10 at the ends thereof carried for rotation in bearings 12 mounted on said end frames.

Shafts 10 are extended past bearings 12 at one end of drums 6 and 8, and pulleys 14 and 16 are fixed respectively to the extended portions of said shafts. Said pulleys are respectively connected by belts 18 and 20 with pulleys 22 and 24, said last named pulleys being carried rigidly on the shaft 26 of a motor 28 mounted rigidly on base 2. Belt 18 is crossed, while belt 20 is not, thereby providing counter-rotation of the drums, as indicated by the directional arrows in Figs. 2 and 4.

Each of drums 6 and 8 includes a tubular hub 30 coaxial with end shafts 10, and a plurality of discs 32 fixed concentrically on said hub and spaced equally along the length of said hub. Extending between each successive pair of discs, parallel to hub 32, are a plurality of rods 34, said rods being spaced equally about the peripheries of said discs. Each of said rods extends through its supporting discs, and is retained therein by wires 36 inserted through said rods adjacent the outer surfaces of said discs, as shown in Figs. 4 to 6. It will be noted that the rods 34 between successive pairs of discs 32 are circumferentially staggered, in order to facilitate removal of each rod individually.

Mounted pivotally on each of rods 34 is a holder member 38, best shown in Figs. 4 to 8. Each of said holders is substantially channel shaped, being disposed longitudinally parallel to rod 34 and being open along one edge and of such length as to fit freely between discs 32. Said channel has a relatively narrow inner side wall 40, and a relatively broad outer side wall 42. Said channel is filled in solid at intervals along its length to provide bearings 44 for rod 34. It will be noted that rod 34 is disposed close to the inner wall 40 of the holder, and this disposition, together with the relatively greater bulk of outer wall 42, causes the holders to assume the position shown in Fig. 4 by centriful force when the drums are rotated. Outer wall 42 is extended longitudinally at each end to form stops 46 overlapping the edges of discs 32 to limit the pivotal movement of the holder on rod 34.

Each of holders 38 carries a plurality of elongated fingers 48 made of a flexible, resilient material such as soft rubber or the like. The body portion of each finger is substantially semicircular in cross-section, as shown in Fig. 9, and its curved face is formed to present a plurality of transversely extending ribs or ridges 50. The base or inner end portion 52 of each finger is rectangular in cross-section, as shown in Fig. 8, and is taperingly enlarged toward its end. In mounting the finger in the holder, the outer or free end of the finger is inserted outwardly through a rectangular hole 54 provided therefore in outer wall 42 of the holder and the entire body portion of the finger is drawn therethrough. The base 52 of the finger is compressed as it is drawn through the hole until grooves 56 formed in opposite sides of said finger base engage wall 42 at opposite sides of said hole. The base of the finger is thus held firmly in the holder. Due to the fact that finger base 52 extends closely adjacent pivot rod 34, the fingers can be inserted only when said rod is removed, and said rod prevents accidental removal of the finger from its holder.

Holders 38 may be proportioned to hold any desired number of fingers. In the drawing the holders are shown holding three and four fingers each, in such relation that the fingers of circumferentially successive holders are relatively staggered, as shown in Figs. 5 and 6. The bearing portions 44 of the holders are disposed to permit this relationship of the fingers.

Figure 2:
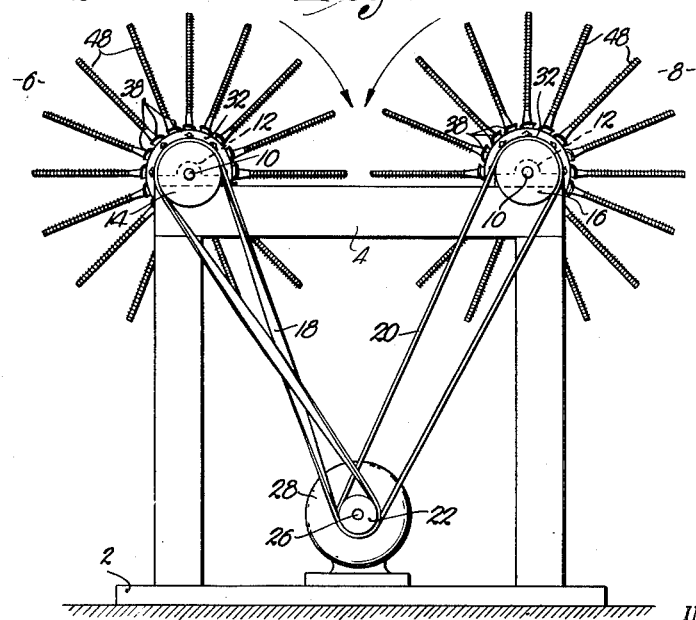
Fig. 2 is an end view of the machine.

In operation drums 6 and 8 are rotated by motor 28 in the directions indicated by the arrows in Fig. 2. The fingers assume positions radial to the drums, due to the action of centrifugal force both on the holders 38 and on the fingers themselves. As the carcass of a fowl is introduced between the drums, it is contacted with a whipping, wiping motion by the ribbed surfaces of the fingers, and the feathers are thereby removed from the carcass. Providing pivotal mounting for the resilient fingers permits the weight, length, and resilience of the fingers to be selected solely on the basis of optimum picking efficiency, since the pivotal mounting of the fingers provides for their deflection to pass about the fowl carcass without particular regard to the properties of the fingers themselves.

Applicant's structure has the advantages of permitting the use of hard, durable holders, thereby virtually eliminating a common point of wear in fingers utilizing resilient fingers; locking the fingers securely in place; and permitting the easy removal and replacement of worn fingers without disturbing the remainder of the fingers.

Although I have shown a specific embodiment of my invention it is apparent that many minor variations of construction and operation could be made without departing from the spirit of the invention, and it is therefore requested that my protection extend to all subject matter properly falling within the scope of the appended claims.

Having thus described the invention, what is claimed as new and desired to be secured by Letter Patent is:

1. Finger holding means for poultry plucking machines comprising an elongated member provided with a rod-receiving bearing, adapting the same for pivotal mounting and thereby swinging movement on an axis parallel with the longitudinal axis thereof, said member being provided with a finger-receiving hole having an axis perpendicular to said swinging axis of the member.

2. Finger holding means for poultry plucking machines comprising an elongated, transversely arcuate member having a finger-receiving hole therein; and an eccentric, rod-receiving bearing mounted on said member, adapting the same for pivotal mounting and thereby swinging movement on an axis parallel with the longitudinal axis thereof.

References Cited in the file of this patent

UNITED STATES PATENTS

| Number | Name | Date |
|---|---|---|
| 614,408 | Palmer | Nov. 15, 1898 |
| 2,354,112 | Garst | July 18, 1944 |
| 2,376,120 | Campbell et al. | May 15, 1945 |
| 2,524,942 | Tomlinson | Oct. 10, 1950 |
| 2,528,215 | Doupnik | Oct. 31, 1950 |
| 2,562,681 | Pine | July 31, 1951 |
| 2,595,435 | Wolfinger | May 6, 1952 |
| 2,596,780 | Meyers et al. | May 13, 1952 |

FOREIGN PATENTS

| Number | Country | Date |
|---|---|---|
| 318,308 | Germany | Sept. 18, 1918 |
| 665,124 | France | Apr. 30, 1929 |
| 116,500 | Australia | Jan. 27, 1943 |